(12) United States Patent
Ripper et al.

(10) Patent No.: US 7,059,118 B2
(45) Date of Patent: Jun. 13, 2006

(54) MIXING DEVICE FOR AN EXHAUST GAS PURIFICATION SYSTEM

(75) Inventors: Wolfgang Ripper, Stuttgart (DE); Bernd Mahr, Plochingen (DE); Johannes Schaller, Leonberg (DE); Cord Scharsack, Schoenaich (DE); Thomas Prasser, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 122 days.

(21) Appl. No.: 10/481,990

(22) PCT Filed: May 25, 2002

(86) PCT No.: PCT/DE02/01924

§ 371 (c)(1),
(2), (4) Date: Jul. 8, 2004

(87) PCT Pub. No.: WO03/004839

PCT Pub. Date: Jan. 16, 2003

(65) Prior Publication Data

US 2004/0237511 A1    Dec. 2, 2004

(30) Foreign Application Priority Data

Jun. 30, 2001   (DE) ................................ 101 31 803

(51) Int. Cl.
*F01N 3/00* (2006.01)
(52) U.S. Cl. ............................ 60/286; 60/295; 60/303; 60/309; 60/324
(58) Field of Classification Search ................ 60/286, 60/295, 296, 303, 309, 310, 324
See application file for complete search history.

(56) References Cited

U.S. PATENT DOCUMENTS

| 3,061,286 | A | | 10/1962 | Mennesson | |
|---|---|---|---|---|---|
| 4,498,786 | A | | 2/1985 | Ruscheweyh | |
| 4,955,183 | A | * | 9/1990 | Kolodzie et al. | 60/303 |
| 4,991,396 | A | * | 2/1991 | Goerlich et al. | 60/303 |
| 5,038,562 | A | * | 8/1991 | Goerlich | 60/274 |
| 5,826,428 | A | * | 10/1998 | Blaschke | 60/303 |
| 6,135,629 | A | | 10/2000 | Dohmann | |
| 6,449,947 | B1 | * | 9/2002 | Liu et al. | 60/286 |
| 6,722,123 | B1 | * | 4/2004 | Liu et al. | 60/286 |

FOREIGN PATENT DOCUMENTS

| DE | 1 186 687 | 2/1965 |
|---|---|---|
| DE | 198 06 265 | 7/1999 |
| DE | 198 20 990 | 11/1999 |
| DE | 199 22 959 | 11/2000 |
| EP | 0 256 965 | 2/1988 |
| EP | 0 894 523 | 7/1997 |
| EP | 0 956 895 | 11/1999 |
| EP | 1 054 139 | 11/2000 |
| SU | 1 211 361 | 2/1986 |
| WO | WO 00/78466 | 12/2000 |

* cited by examiner

Primary Examiner—Binh Q. Tran
(74) Attorney, Agent, or Firm—Kenyon & Kenyon

(57) ABSTRACT

A mixing device for mixing the exhaust gas of an internal combustion engine flowing in an exhaust pipe with a reducing agent as well as an exhaust gas purification system having such a mixing device, in which a mixing body is positionable in the exhaust pipe and which includes a gas impact surface and a spray impact surface so that exhaust gas flowing from the internal combustion engine is able to strike the gas impact surface and reducing agent, which is suppliable transversely to the exhaust gas flow, is able to strike the spray impact surface, the spray impact surface and the gas impact surface forming disjointed sub-areas of the surface of the mixing body. The mixing device distributes the reducing agent uniformly over the cross section of the exhaust pipe and mixes it uniformly with the exhaust gas.

10 Claims, 3 Drawing Sheets

MIXING DEVICE FOR AN EXHAUST GAS PURIFICATION SYSTEM

FIELD OF THE INVENTION

The present invention is directed to a mixing device and an exhaust gas purification system.

BACKGROUND INFORMATION

For the reduction of $No_x$ from the exhaust gas of diesel engines in particular, a reducing agent, an aqueous urea solution in particular, may be introduced into the exhaust system. In doing so, for example, ammonia is obtained from the urea using a hydrolytic catalyst and the ammonia reacts selectively with the nitrogen oxides contained in the exhaust gas in an SCR catalytic converter to form molecular nitrogen and water (SCR is an abbreviation for "selective catalytic reduction"). A mixing device for mixing the reducing agent with the exhaust gas is referred to in European patent document EP 0 894 523. However, it may exhibit a high flow resistance. The provision of a plate forming a 45 degree angle to the main flow direction of the exhaust gas is referred to in German patent document DE 198 06 265.

SUMMARY OF THE INVENTION

In contrast, the mixing device and exhaust gas purification system according to the present invention may have the advantage that the flow profile of the exhaust gas is not influenced disadvantageously. Only a slight flow resistance is imposed on the exhaust gas and a good uniform distribution of the reducing agent in the exhaust system is ensured. In addition, a spraying of reducing agent onto the diametrically opposed wall of the exhaust pipe is avoided. The reducing agent is entrained by the exhaust gas flow passing over the mixing body and is uniformly distributed starting from the center of the exhaust pipe. This may result in improved dynamic properties because it is not possible for any reducing agent to evaporate from the wall later. In addition, the provision of a gas impact surface and a separate spray impact surface allows for setting a flow guidance that ensures an optimized mixture formation. Furthermore, the reducing agent spray reaches the mixing body in all operating points on the spray impact surface provided for this purpose and whose spatial orientation has been optimized for this purpose.

If braces designed as guide vanes are provided, for example, an additional swirl may be imposed on the exhaust gas flow, which further supports the mixing of the exhaust gas with the reducing agent in an advantageous manner.

DETAILED DESCRIPTION

Figure 1:
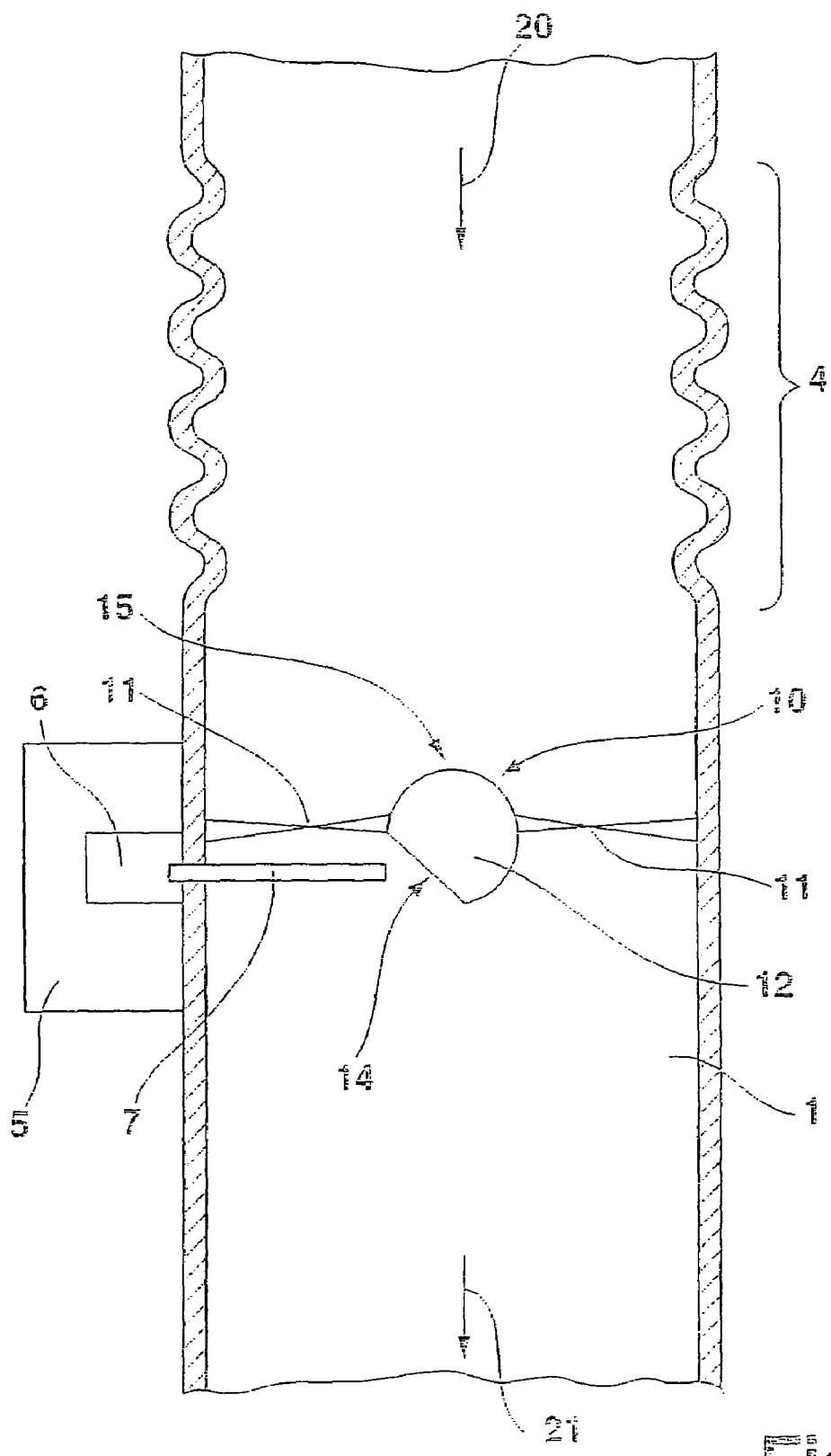
FIG. 1 shows a section of an exhaust gas purification system.

In a cross-sectional side view, FIG. 1 shows an exhaust pipe 1, having a corrugated region 4. The arrow indicated by reference numeral 20 represents the exhaust gas flow coming from an internal combustion engine. Downstream of corrugated region 4 is a mixing device 10 having a mixing body 12 in the form of a spherical calotte. This mixing body is connected to the exhaust pipe via two guide vanes 11. The spherical surface of the spherical calotte faces exhaust gas flow 20 and is identified below as gas impact surface 15. A flat spray impact surface 14 of mixing body 12 is located on the side of the mixing body facing away from exhaust gas flow 20. A reducing agent metering device 5 is mounted on the outside of the exhaust pipe at the level of mixing device 10, injector 6 of the metering device being capable of supplying an injector tube 7 protruding into the exhaust pipe with a reducing agent, urea, for example. Arrow 21 indicates the flow of an exhaust gas-reducing agent mixture.

Metering device 5 feeds a reducing agent to the exhaust gas flow, the addition being metered by injector 6. The spray of the reducing agent is aimed directly at spray impact surface 14 without being mixed with air beforehand. The size of the area and the configuration of the area in relation to injector 7 are dimensioned in such a way that the reducing agent always strikes the spray impact surface independent of the changing volume flow of the exhaust gas. The flow of the exhaust gas present at gas impact surface 15 blows the reducing agent into the flow and ensures an optimized thorough mixing. Guide vanes 11 produce an additional swirl in the exhaust gas flow to additionally promote the mixing of the reducing agent with the exhaust gas. The exhaust gas-reducing agent mixture 21 thus formed flows in an SCR catalytic converter, which is not described in greater detail, located downstream to reduce the nitrogen oxides in the exhaust gas. Corrugated region 4, through which exhaust gas flow 20 passes before reaching the mixing device, produces turbulence in the flowing gas, which additionally promotes the mixing of exhaust gas and reducing agent.

In an alternative embodiment, mixing device 10 may also be used to mix the exhaust gas with fuel injected into the exhaust system downstream of the engine in order to perform an effective exhaust gas aftertreatment in combination with catalytic converters and/or particle filters positioned downstream. Corrugated region 4 may also be omitted in simple embodiments; likewise, the braces may be designed as bars or metal strips without guide vanes.

The mixing device may also be configured in such a way that the spray impact surface faces the exhaust gas flow so that the reducing agent may be sprayed onto the spray impact surface on the side of the mixing device facing the exhaust gas flow.

Figure 2:
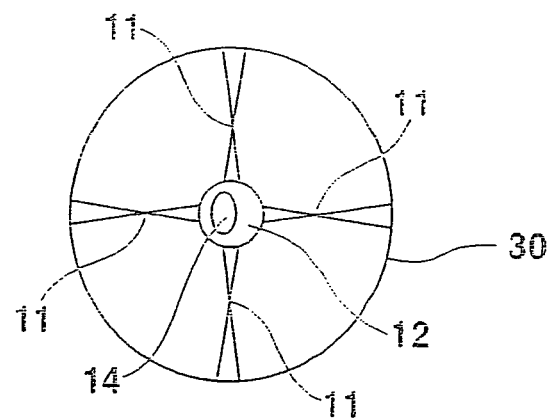
FIG. 2 shows a top view of a mixing device.

FIG. 2 shows a top view of a mixing device similar to the device depicted in FIG. 1. However, in this case four instead of two braces designed as guide vanes 11 are provided. These braces are not joined directly to the exhaust pipe but instead are connected via a metal strip 30, which encircles mixing body 12. In the depiction shown, the metal strip is only recognizable as a line. The radius of the closed circular metal strip is selected in such a way that the mixing device may be inserted into the exhaust pipe to fit precisely and it is only necessary to fasten the metal strip in the exhaust pipe using rivets or screws or by welding.

The mixing device of FIG. 2 performs the same function as the one of FIG. 1. Only the manner of attachment has been varied somewhat. In another alternative embodiment, it is provided that metal strip 30 is designed in the form of an exhaust pipe section, into which injector 7 has already been integrated so that during assembly, it is only necessary to join the mixing device to the particular exhaust pipe ends and to the metering device.

Figure 3:
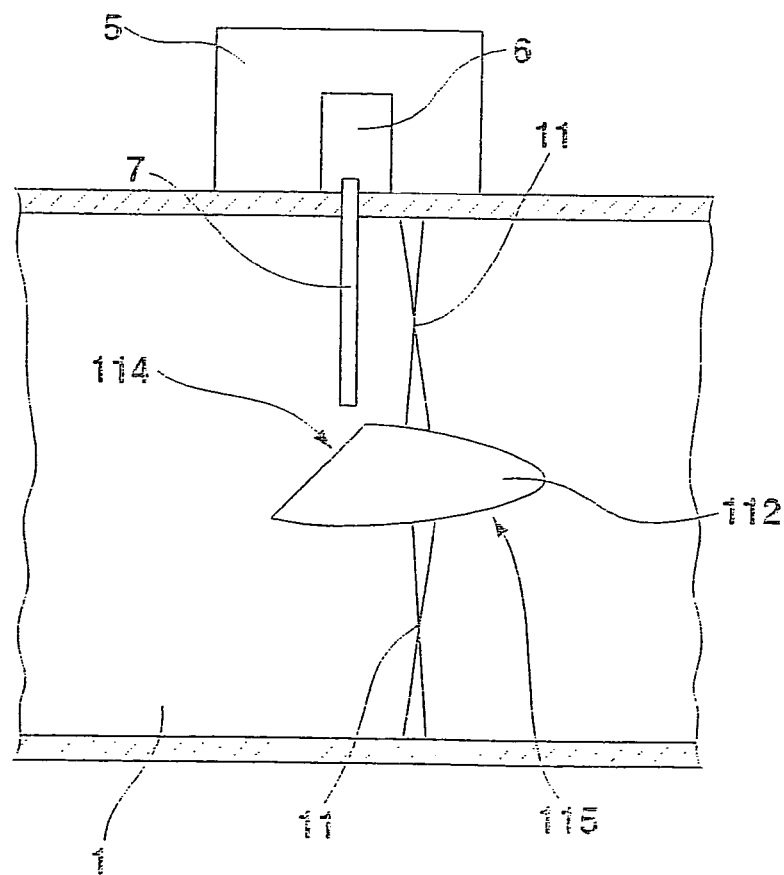
FIG. 3 shows a section of another exhaust gas purification system.

FIG. 3 shows an exhaust gas purification system in which mixing body 112 does not have the shape of a spherical calotte but instead the shape of a conical calotte. The point of the cone is somewhat rounded off. It forms gas impact surface 115 of mixing body 112 which faces the exhaust gas coming from the internal combustion engine. Flat spray impact surface 114 may also be designed as a milled off portion of a basic conical structure.

Compared to a basic structure in the shape of a spherical calotte, mixing body 112 exhibits further reduced flow resistance and also ensures a uniform distribution of the reducing agent and its mixture with the exhaust gas.

Figure 4:
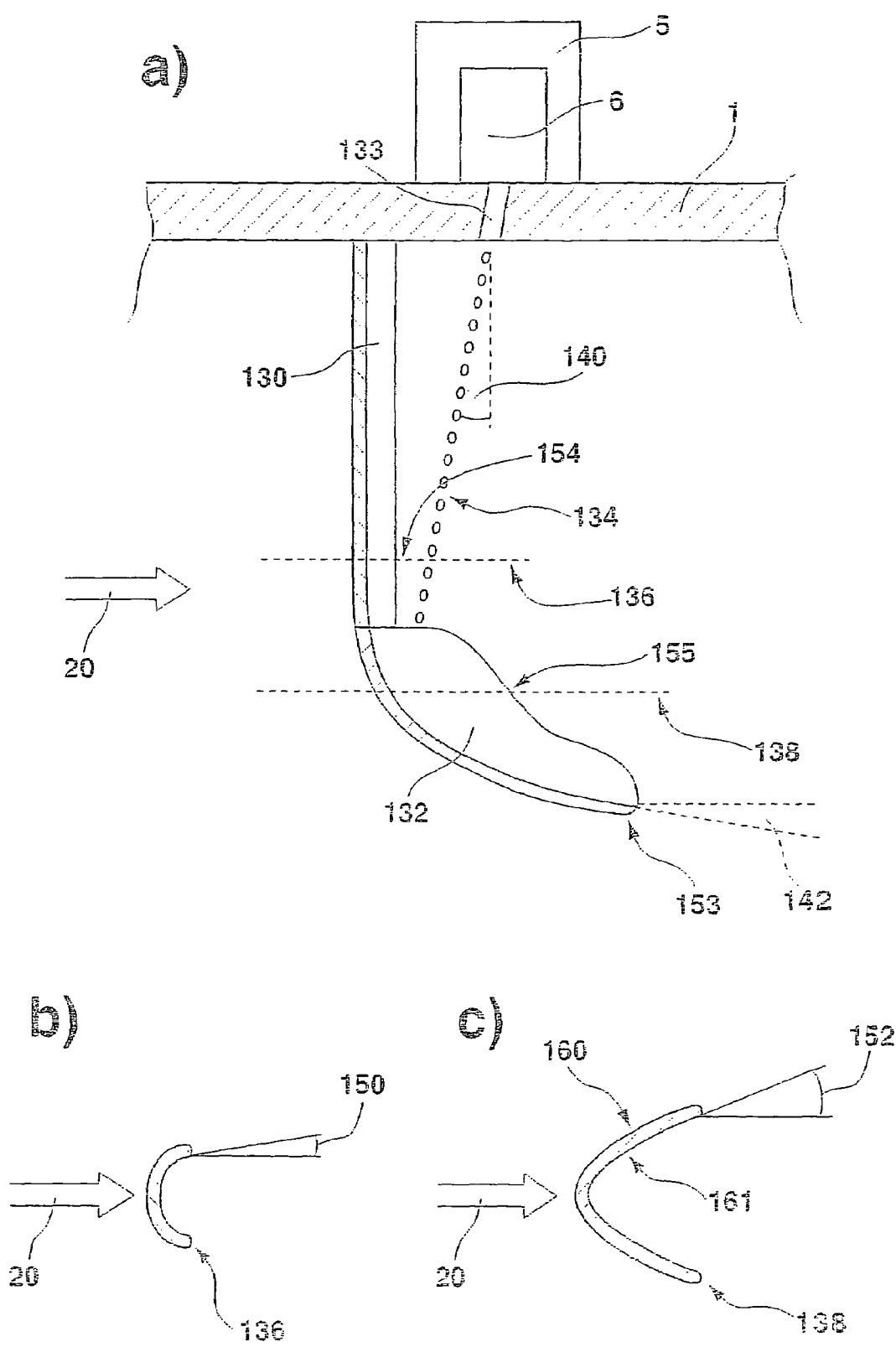
FIG. 4a shows another exemplary embodiment.
FIG. 4b shows another exemplary embodiment.
FIG. 4c shows another exemplary embodiment.

In FIG. 4, sub-image a) shows a cross-sectional side view of a mixing device having a mixing body identified in the following as impact device 132 and positioned in the interior of an exhaust pipe, the mixing body being fastened to sidewall 1 of the exhaust pipe by a brace identified in the following as holding device 130. The sections having reference numerals 136 and 138, respectively, in sub-image a) are shown in sub-images b) and c). Both the holding device and the impact device form an arched surface, i.e., an arched gas impact surface 160, to the exhaust gas flow 20 flowing from the internal combustion engine, it being possible for the exhaust gas to pass by the mixing device along the gas impact surface with low flow resistance.

While the holding device has an essentially semicircular cross-section and protrudes into the exhaust pipe from the exhaust pipe wall transverse to the exhaust gas flow, impact device 132 has the shape of a vane, on the interior surface or spray impact surface 161 of which reducing agent stream spray 134, which emerges from outlet opening 133 at an angle 140 to the exhaust pipe cross-section, is able to impact. End region 153 of the impact device is inclined at a slight angle 142 to the direction of exhaust gas flow 20, the angle being between 0 and 30 degrees. Marginal zones 154 and 155 of the holding device and impact device, respectively, have small angles 150 and 152, respectively, in relation to flow direction 20 of the exhaust gas, the angles typically being between 0 and 30 degrees.

The mixing device according to FIG. 4 ensures a uniform distribution of the reducing agent in the exhaust pipe by spraying the reducing agent stream spray metered by injector 6 onto the impact device. The fluctuation range of angle 140 as a function of the strength of the exhaust gas flow is kept small by the arched design of holding device 130 and by a small angle 150 of the marginal zone of the holding device in relation to the exhaust gas flow. Also the side of the impact device facing the exhaust gas flow has small angles 142 and 152 in the area of marginal zone 155 and in end region 153, respectively. Such a design of the impact device prevents the exhaust gas flow from carrying the reducing agent from the inside of the impact device in the direction of the exhaust pipe wall. This prevents the exhaust pipe wall from being undesirably wetted with reducing agent.

In an alternative embodiment, the holding device and/or the impact device are made from a perforated plate for the purpose of increasing the exhaust gas turbulence and thus reducing the size of the reducing agent drops formed.

What is claimed is:

1. A mixing device for mixing an exhaust gas of an internal combustion engine flowing in an exhaust pipe with a reducing agent comprising:
    a mixing body that is positionable in the exhaust pipe, the mixing body having a gas impact surface and a spray impact surface so that the exhaust gas flowing out of the internal combustion engine is able to strike the gas impact surface and reducing agent, which is suppliable transversely to the exhaust gas flow, is able to strike the spray impact surface;

wherein:
    the spray impact surface and the gas impact surface form disjointed sub-areas of the surface of the mixing body,
    the spray impact surface and the gas impact surface are located on diametrically opposed sides of the mixing body,
    the gas impact surface has the shape of an arch,
    the gas impact surface is formed by a surface of a part of the mixing body tapering centrically in a direction of flow in the exhaust pipe so that only a slight flow resistance is imposed on the exhaust gas, and
    at least one of a holding device for the mixing body and the mixing body include holes connecting spaces in front of and behind the mixing device.

2. The mixing device of claim 1, wherein the mixing body is positionable so that the spray impact surface is formed by a surface area of the mixing body downstream of the gas impact surface in the exhaust gas flow.

3. The mixing device of claim 1, wherein the mixing body has the shape of a vane.

4. The mixing device of claim 3, wherein at least one of the holding device and the mixing body are constructed from a perforated plate.

5. The mixing device of claim 3, wherein the holding device includes at least one brace that is arranged in the shape of an arch.

6. The mixing device of claim 1, wherein the mixing body has the shape of one of a spherical and a conical calotte.

7. The mixing device of claim 6, wherein the gas impact surface has the shape of a spherical surface section or a section of the surface of a cone rounded off at the point.

8. The mixing device of claim 6, wherein the holding device includes at least one brace arranged as a guide vane.

9. The mixing device of claim 5, wherein the at the least one brace, at its end facing away from the mixing body, is joined to a metal strip encircling the mixing body.

10. An exhaust gas purification system for purifying an exhaust gas of an internal combustion engine, comprising:
    an exhaust pipe;
    a device for feeding a reducing agent into the exhaust pipe; and
    a mixing device for mixing the exhaust gas with the reducing agent, the mixing device including a mixing body positionable in the exhaust pipe, the mixing body including a gas impact surface and a spray impact surface so that the exhaust gas flowing out of the internal combustion engine is able to strike the gas impact surface and reducing agent, which is suppliable transversely to the exhaust gas flow, is able to strike the spray impact surface;
wherein:
    the spray impact surface and the gas impact surface form disjointed sub-areas of the surface of the mixing body,
    the spray impact surface and the gas impact surface are located on diametrically opposed sides of the mixing body,
    the gas impact surface has the shape of an arch,
    the gas impact surface is formed by the surface of a part of the mixing body tapering in a direction of flow in the exhaust pipe so that only a slight flow resistance is imposed on the exhaust gas, and
    at least one of a holding device for the mixing body and the mixing body include holes connecting spaces in front of and behind the mixing device.

* * * * *